(12) United States Patent
Dailey

(10) Patent No.: US 6,466,651 B1
(45) Date of Patent: Oct. 15, 2002

(54) CALL AGENTS AND SYSTEMS AND METHODS FOR PROVIDING EMERGENCY CALL SERVICES ON HETEROGENEOUS NETWORKS

(75) Inventor: Timothy E. Dailey, Forest, VA (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 262 days.

(21) Appl. No.: 09/614,842

(22) Filed: Jul. 12, 2000

(51) Int. Cl.[7] .............................................. H04M 11/04
(52) U.S. Cl. ................ 379/37; 379/90.01; 379/201.01; 725/106
(58) Field of Search .......................... 379/37–51, 90.01, 379/93.08, 201.01, 201.2, 212.01; 725/106, 109

(56) References Cited

U.S. PATENT DOCUMENTS 5,764,734 A * 6/1998 Medendorp et al. ..... 379/90.01
5,999,612 A * 12/1999 Dunn et al. ............ 379/212.01

OTHER PUBLICATIONS

PacketCable™ Network–Based Call Siganling Protocol Specification, Pkt–SP–EC–MGCP–I01–990312, Cable Television Laboratories, Inc. (Mar. 12, 1999).

* cited by examiner

Primary Examiner—Wing Chan
(74) Attorney, Agent, or Firm—Myers, Bigel, Sibley & Sajovec

(57) ABSTRACT

Call agents methods and systems are provided for providing emergency services on a heterogeneous network, such as a cable system, having a bandwidth. A request for telephony service is received wherein the telephony service will be provided over the cable system. It is determined if a portion of the bandwidth of the cable system which is allocated to telephony is fully utilized and if the request for telephony service is a request for emergency service. A portion of the bandwidth of the cable system is obtained to provide the requested telephony service if the request for telephony service is a request for emergency service and the portion of the bandwidth of the cable system which is allocated to telephony is fully utilized. The requested emergency service is provided using the obtained portion of the bandwidth of the cable system.

44 Claims, 8 Drawing Sheets

CALL AGENTS AND SYSTEMS AND METHODS FOR PROVIDING EMERGENCY CALL SERVICES ON HETEROGENEOUS NETWORKS

FIELD OF THE INVENTION

The present invention relates to telephony and more particularly, to telephony over heterogeneous networks such as cable systems.

BACKGROUND OF THE INVENTION

Recently, great interest has been shown in the area of cable telephony. With the recent introduction of cable modems, cable operators have shown great interest in technology that will allow them to provide telephone services along with television and data services. If successful, such operators could offer customers (users) one data pipe that will handle data, video and voice. Investigation of the possibilities of cable telephony has begun, with much of the work in this area being performed by Cable Television Laboratories, Inc. (CableLabs). This work by CableLabs has resulted in a proposed specification (PacketCable) for Internet based voice and video products over cable systems. PacketCable has focused on Internet Protocol (IP) based telephony which interfaces with the existing Public Switch Telephone Network (PSTN) via conventional Signaling System 7 (SS7) based gateways. While the IP based telephony approach may be very flexible, it is a new and immature technology. It may take time to develop the rich set of telephony features that are currently offered by Class 5 telephony switches.

FIG. 1 illustrates the IP telephony architecture generally corresponding to that proposed by PacketCable. In the PacketCable 1.0 architecture, calls are typically controlled by a central Call Agent (CA) 170. The Media Terminal Adapter (MTA) 110 uses a Data Over Cable Service Interface Specification (DOCSIS) Cable Modem 120 to communicate with the CA 170 over the cable network 130 and the IP network 150 through the Cable Modem Termination System (CMTS) 140. While illustrated as two separate blocks in FIG. 1, the MTA 110 and the cable modem (CM) 120 may be a single device. Thus, the MTA 110 and the CM 120 may be a single cable modem with a telephony application which controls a standard telephone set 100.

The MTA 110 is typically controlled by the CA 170 using a protocol known as Network based Call Signaling (NCS) which has been defined by PacketCable. The Cable Telephony Gateway (CTG) 160 interfaces the cable plant to the PSTN 180 using SS7. Voice is digitized and carried as IP packets between the MTA 110 and CTG 160. The MTA 110 converts between analog voice and IP packetized voice while the CTG 160 converts between IP packetized voice and standard 64 kbps PCM for the PSTN.

When the MTA 110 powers up, it typically communicates with the CA 170 which instructs the MTA 110 to look for an off-hook condition. In a typical outbound call, the user picks up the phone 100 connected to the MTA 110, or goes "off-hook." The MTA 110 sends a NOTIFY message to the CA 170 to indicate the off-hook condition. If capacity is available on the cable system, the CA 170 typically instructs the MTA 110 to provide a dial tone and collect dialed digits. When dialing is complete, the MTA 110 sends the dialed digits to the CA 170 via the NOTIFY command. The CA 170 generally verifies that the user is allowed to place the call and then notifies the CTG 160 of the number the caller wishes to dial. The CTG 160 communicates with the PSTN 180 using SS7 which is a message based protocol. That is, the CTG 160 typically tells the PSTN 180 the desired number to dial in a digital message. If the PSTN 180 accepts the call, the CA 170 generally sets up an IP connection between the MTA 110 and the CTG 160. Voice is carried in data packets over the IP network and may be sent as continuous Pulse Code Modulation (PCM) data between the CTG 160 and PSTN 180. If the caller has the feature Caller ID with call waiting and someone else attempts to call the original caller, the CTG 160 receives a SS7 message from the PSTN 180 that indicates an incoming call including the caller's ID. The CTG 160 notifies the CA 170 which then directs the MTA 110 to signal to the original caller that a call is incoming and to display the caller ID.

As is seen from the above example, in the PacketCable type system, the CA 170 generally controls all aspects of the call. The MTA 170 follows the instructions provided by the CA 170. Furthermore, the use of SS7 signaling to interface to the PSTN 180 provides call information in a digital message format that the CA 170 can typically easily interpret to provide instructions to the MTA 110.

While the PacketCable type system may provide a mechanism for providing basic telephony functions over a cable plant, some cable system operators may be unwilling to wait for the IP telephony technology to evolve and mature. These operators may have access to Class 5 switches, and may want to leverage this investment to deploy mature cable telephony as soon as possible. Therefore, a hybrid architecture has emerged which uses the Class 5 switch to control phone calls while the cable plant is used as the "last mile" connection to customers. However, merging cable telephony with the existing Class 5 switches is typically not straight forward because the two approaches have very different paradigms.

Typically, standard analog phone lines are connected directly to a Class 5 switch, so that the switch controls all aspects of the call. The switch detects off-hook, provides a dial tone and or ringing and handles advanced features like call waiting or caller ID. The switch typically controls the phone using in-band signaling such as dial tone and dual tone multi-frequency (DTMF) and electric currents and voltages to signal on-hook and off-hook as well as power ringing. As analog lines are generally limited to approximately 3 miles, remote data terminals (RDT) may be used to expand the reach of the switch. Such a system is illustrated in FIG. 2.

As seen in FIG. 2, the RDT 210 attaches to the analog telephones 200 and 200' and communicates with the Class 5 switch 220, and, therefore, the PSTN 230, via a T1 or higher order digital link. The T1 can transfer in-band signals like DTMF, because these signals are typically sampled and pulse code modulation (PCM) encoded just like voice. However, the T1 generally cannot directly include the currents and voltages needed for hook detection and ringing. Therefore, ABCD signaling is typically used to convey this information. ABCD bits are part of the Enhanced Super Frame format used on T1s. Low order bits are "robbed" from the PCM stream to convey the extra ABCD information. The RDT 210 may convert ABCD bits to voltages and currents and vice versa. The RDT 210 is generally a slave to the switch, notifying the switch of events on the analog line or responding to commands from the switch, such as power ringing.

Initial attempts to merge the Class 5 switch and cable telephony produced the architecture illustrated in FIG. 3. In this approach the RDT is replaced by the Cable Telephony Gateway (CTG) 300 and the analog telephone lines are replaced by an IP network 150 and a cable plant 130, 140 of a cable system. The CA 310 and switch 220 both try to control the call. The switch 220 generally thinks it is talking to a regular RDT and it attempts to control the call using in-band signaling and ABCD bits. The CTG 300 does not receive formatted SS7 messages as in the PacketCable system described above, so it typically must interpret the in-band signaling and ABCD bits and convert them to NCS messages for the CA 310. The CA 310 then may attempt to control the MTA 110. This approach may fail, however, because of the tight timing requirements of the switch 220. The latency added by interpreting in-band signals and coordinating with the CA 310 may cause many Custom Local Area Signaling Services (CLASS) features, such as Caller ID and Call Waiting, to fail.

One particular challenge for cable telephony systems using in-band control architectures, such as those described above with reference to FIG. 3, is supporting delivery of emergency call services. In particular, such systems typically provide for notification from the MTA 110 to the call agent 310 when a phone is picked up to generate an off-hook signal. If enough bandwidth for the call is available in the cable system (for example, through the GR-303 interface), the call agent 310 typically sets up a Digital Signal Level 0 (DS0) with the switch on the GR-303 interface and sets up a Real Time Transport Protocol (RTP) connection with the media terminal adapter (MTA). Once these two connections are complete, the MTA may be controlled by the switch 220. The switch 220 may then provide a dial tone, collect dial digits, etc.

A problem with such systems may occur when dialing an emergency number, such as 911, when the cable system is busy. Typically, a set amount of bandwidth on the cable network 130 is allocated for phone calls using cable telephony and the remainder may be allocated to other data services. If the cable telephony allocated bandwidth is completely consumed (i.e., fully utilized), new requests for phone calls are typically denied by the call agent 310 and the customer receives a "fast busy" signal on the telephone 100 to indicate that the system is temporarily full. The customer, thus, would not receive a dial tone and has no way to advise the switch 220 that the desired service request is for an emergency call. In contrast, if a customer's telephone 100 were connected to the switch 220 via an analog telephone line, the customer would typically always receive a dial tone and could dial 911. The switch 220 could then give the call a priority and connect it to the proper authorities.

SUMMARY OF THE INVENTION

Systems and methods are provided in embodiments of the present invention for providing emergency services on a heterogeneous network comprising a public switched telephone network (PSTN) and a packet based network to a local user, the packet based network to a local user having a finite bandwidth for telephony services. The packet based network may be a cable system. A request for telephony service is received wherein the telephony service will be provided over the packet based network. It is determined if a portion of the bandwidth of the packet based network which is allocated to telephony is fully utilized and if the request for telephony service is a request for emergency service. A portion of the bandwidth of the packet based network is obtained to provide the requested telephony service if the request for telephony service is a request for emergency service and the portion of the bandwidth of the packet based network which is allocated to telephony is fully utilized. The requested emergency service is provided using the obtained portion of the bandwidth of the packet based network to the local user. The heterogeneous network may be a cable system.

In other embodiments of the present invention, the bandwidth is obtained by allocating an alternate portion of the bandwidth of the cable system which is not allocated to telephony to the requested telephony service if the request for telephony service is a request for emergency service and the portion of the bandwidth of the cable system which is allocated to telephony is fully utilized. The cable system may be a cable telephony system having an in-band control architecture, the telephony service may be a voice call service and the emergency service may be an emergency call. The request for telephony service may be received from a user station. The user station may be a media terminal adapter. The allocated alternate portion of the bandwidth may be a portion of the bandwidth of the cable system associated with data services on the cable system.

In further embodiments of the present invention, the determination of whether the request for telephony service is a request for emergency service includes providing a dial tone to a user regardless of whether the portion of the bandwidth of the cable system which is allocated to telephony is fully utilized, receiving a number associated with the requested voice call service from the user station and determining if the received number is an emergency call number. The emergency call number may be 911.

In other embodiments of the present invention, the requested emergency service is provided by transmitting the received number from the user station to a telephone switch and then providing the emergency service using the allocated alternate portion of the bandwidth of the cable system to support communications between the user station and the telephone switch. A connection may be established between the user station and the telephone switch using the allocated alternate portion of the bandwidth of the cable system and the received number may be transmitted from the user station to a telephone switch using the established connection. Communication of the received number to a user of the user station may be suppressed while transmitting the received number from the user station to a telephone switch.

In further embodiments of the present invention, methods are provided for providing emergency call service on a cable telephony system having an in-band control architecture. An off-hook signal from a user is detected. A service request is transmitted to the cable telephony system responsive to the detected off-hook condition. A request to provide a dial tone to the user is received from the cable telephony system responsive to the transmitted service request. A dial tone is provided to the user responsive to the request to provide a dial tone. A number associated with the emergency call service is received from the user and provided to the cable telephony system. An allocation of a portion of the bandwidth of the cable telephony system which is not allocated to telephony is received from the cable telephony system and the received number is transmitted to a telephone switch using the received allocation of a portion of the bandwidth of the cable telephony system to initiate the emergency call service. A number not associated with the emergency call service may also be received from a user. The received number not associated with the emergency call service may be provided to the cable telephony system and a denial of service received from the cable telephony system. A denial of service indication may be provided to the user responsive to the received denial of service.

In other embodiments of the present invention, the portion of the bandwidth of the cable system is obtained by preempting a part of the portion of the bandwidth of the cable system which is allocated to telephony if the request for telephony service is a request for emergency service and the portion of the bandwidth of the cable system which is allocated to telephony is fully utilized. The pre-empting may be provided by terminating at least one call which is utilizing the portion of the bandwidth of the cable system which is allocated to telephony or by reducing a bandwidth allocated to at least one such call.

In further embodiments of the present invention, methods are provided for providing emergency call service on a cable telephony system having an in-band control architecture. A service request is received from a user station. It is determined if a portion of the bandwidth of a cable system which is allocated to the cable telephony system is fully utilized. A request to provide a dial tone is transmitted to the user station responsive to the received service request regardless of whether the portion of the bandwidth of the cable system which is allocated to the cable telephony system is fully utilized. A number associated with the service request is received from the user station. It is determined if the received number is an emergency call number associated with the emergency call service. A portion of the bandwidth of the cable system which is not allocated to the cable telephony is allocated to the service request if the received number is an emergency call number associated with the emergency call service and the portion of the bandwidth of the cable system which is allocated to the cable telephony system is fully utilized. A connection is established between the user station and a telephone switch using the allocated portion of the bandwidth of the cable system. A request is transmitted to the user station requesting transmission of the received number to the telephone switch using the allocated portion of the bandwidth of the cable system. A request is transmitted to provide a system busy signal, such as a fast busy signal, to the user station if the received number is not an emergency call number associated with the emergency call service and the portion of the bandwidth of the cable system which is allocated to the cable telephony system is fully utilized. The cable telephony system may be GR-303 based and the connection may be established by setting up Internet Protocol (IP) and GR-303 connections.

In other embodiments of the present invention, the user station is a media terminal adapter and the media terminal adapter detects an off-hook condition from a user and transmits a notify message to the cable telephony system as the service request. The media terminal adapter receives the request to provide a dial tone, provides a dial tone to the user responsive to the received request to provide a dial tone and then receives dual tone multi-frequency (DTMF) digits from the user and provides the received DTMF digits to the cable telephony system as the number associated with the service request. In addition, the media terminal adapter receives the request to provide a busy signal to the user and provides a system busy signal to the user responsive to the received request to provide a busy signal to the user.

In further embodiments of the present invention, methods are provided for providing emergency call service on a cable telephony system having an in-band control architecture. A service request is received from a user station. It is determined if a portion of the bandwidth of a cable system which is allocated to the cable telephony system is fully utilized. A request to provide a dial tone is transmitted to the user station responsive to the received service request regardless of whether the portion of the bandwidth of the cable system which is allocated to the cable telephony system is fully utilized. A number associated with the service request is received from the user station. It is determined if the received number is an emergency call number associated with the emergency call service. A part of the portion of the bandwidth of the cable system which is allocated to telephony is pre-empted if the received number is an emergency call number associated with the emergency call service and the portion of the bandwidth of the cable system which is allocated to the cable telephony system is fully utilized. A connection is established between the user station and a telephone switch using the preempted part of the portion of the bandwidth of the cable system. A request is transmitted to the user station requesting transmission of the received number to the telephone switch using the pre-empted part of the portion of the bandwidth of the cable system. A request is transmitted to provide a system busy signal to the user station if the received number is not an emergency call number associated with the emergency call service and the portion of the bandwidth of the cable system which is allocated to the cable telephony system is fully utilized.

In further embodiments of the present invention, call agents are provided for a cable system having a bandwidth. The call agent includes a media terminal adapter (MTA) control circuit that receives in-band control signals from a MTA and provides in-band control signals to the MTA. The control signals from the MTA include a request for telephony service and an associated service identifier. The MTA control circuit is configured to determine if a received request for telephony service is a request for emergency service based on the associated service identifier. A bandwidth control circuit determines if a portion of the bandwidth of the cable system which is allocated to telephony is fully utilized. A call setup circuit obtains a portion of the bandwidth of the cable system to provide the requested telephony service if the request for telephony service is a request for emergency service and the portion of the bandwidth of the cable system which is allocated to telephony is fully utilized. The call setup circuit is configured to establish a connection between the MTA and a telephone switch to support the requested emergency service using the obtained portion of the bandwidth of the cable system.

In other embodiments of the present invention, the call setup circuit is configured to allocate an alternate portion of the bandwidth of the cable system which is not allocated to telephony to the requested telephony service if the request for telephony service is a request for emergency service and the portion of the bandwidth of the cable system which is allocated to telephony is fully utilized. In alternative embodiments, the call setup circuit is configured to pre-empt a part of the portion of the bandwidth of the cable system which is allocated to telephony if the request for telephony service is a request for emergency service and the portion of the bandwidth of the cable system which is allocated to telephony is fully utilized.

While the present invention has been described above in part with reference to method aspects, corresponding systems and call agents are also provided.

DETAILED DESCRIPTION OF THE INVENTION

Figure 1:
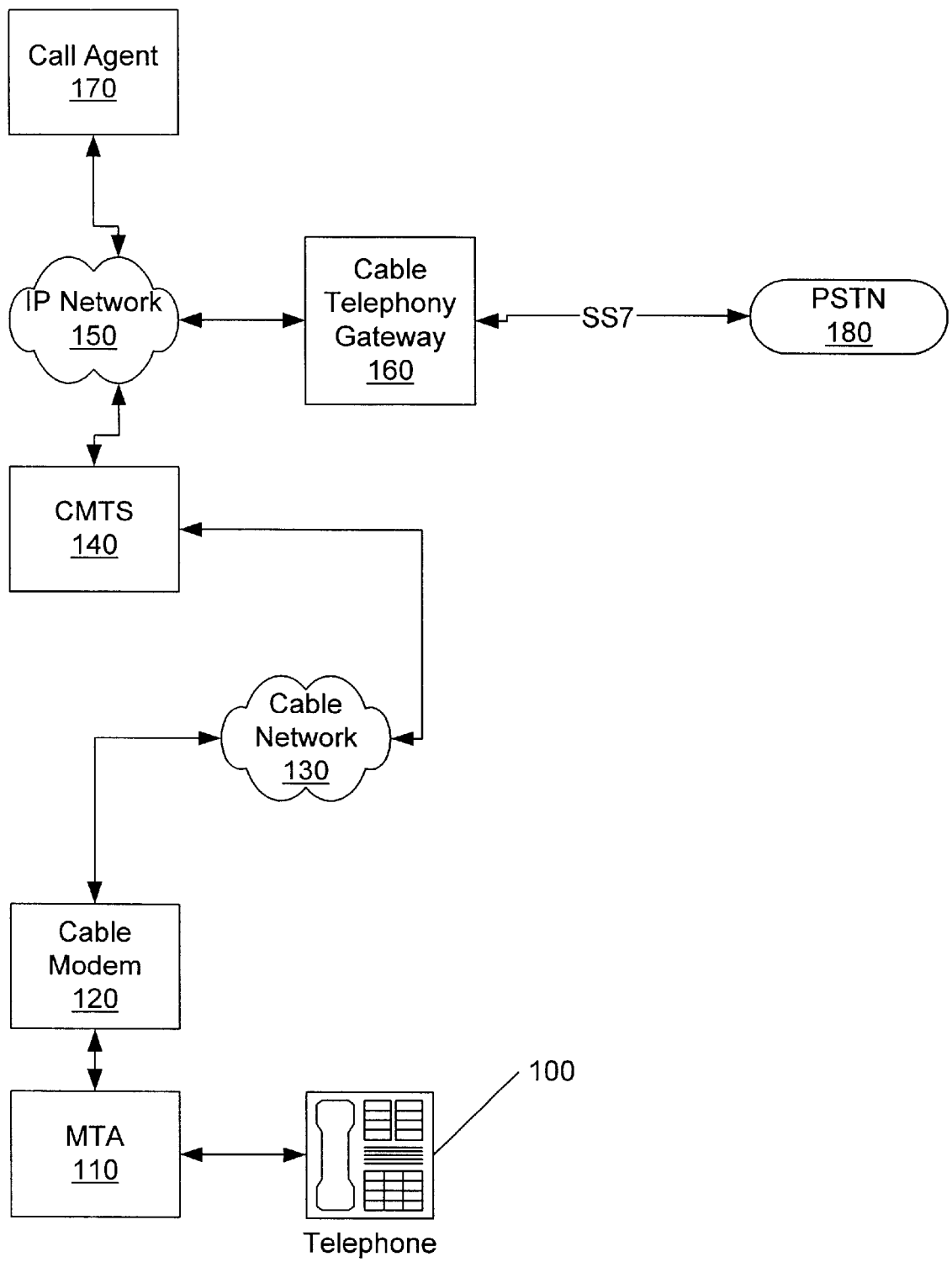
FIG. 1 is a block diagram of an Internet Protocol (IP) based cable telephony system according to the prior art.
Figure 2:
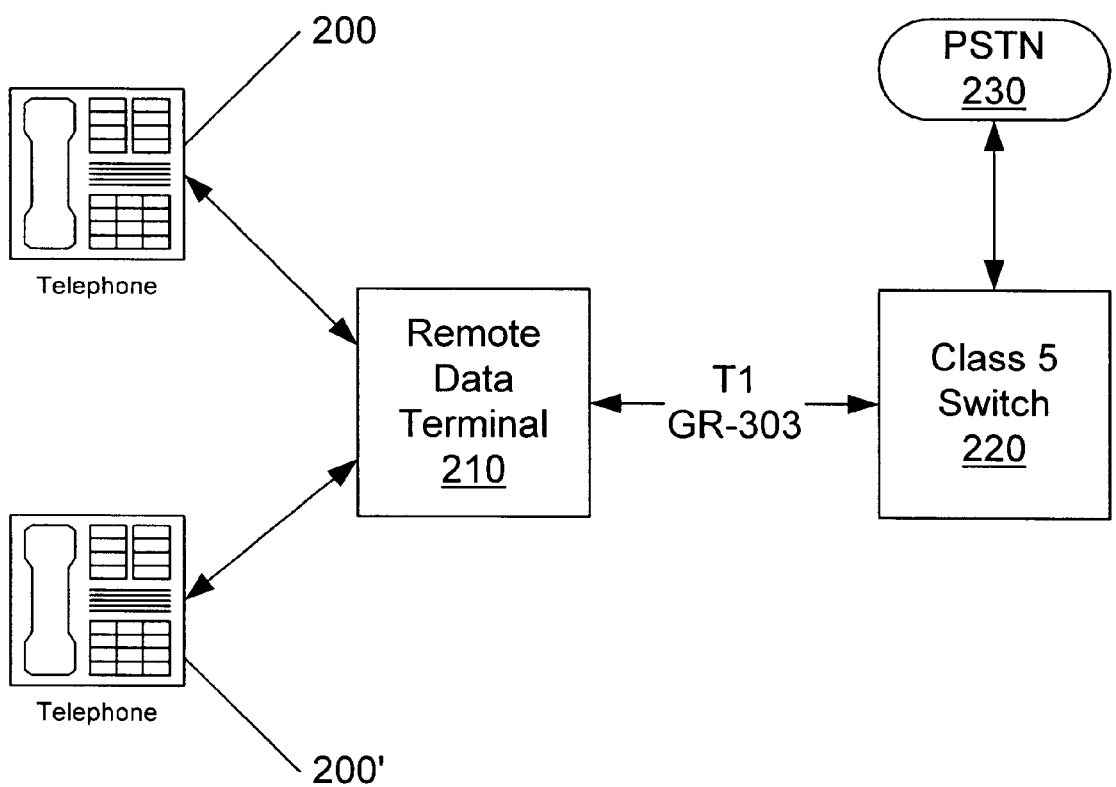
FIG. 2 is a block diagram of a telephone system including a remote data terminal according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combing software and hardware aspects.

By way of background, cable systems which support cable telephony may take many forms, including those described with reference to FIGS. 1 and 3 above. A further architecture in which the emergency services support of the present invention may be implemented will be described with reference to FIG. 4. It will be understood by those of skill in the art that such cable systems typically include cabling infrastructure, such as coaxial cable or fiber optic cables, or a combination thereof, connecting the remote customer locations to a CMTS 140, 440. The CMTS 140, 440 can provide services, such as television service, telephone service (cable telephony), and Internet service to customers of the cable system via the cable modems 120, 420 by transferring data over the cable network 130, 430.

The CMTS 140, 440 typically manages the services provided to the respective customers in the cable system. For example, a first customer may receive television, telephone and Internet services while a second customer may receive only Internet service. Moreover, different customers may receive a different quality of service. For example, a first customer may receive Internet service at a relatively low bandwidth while a second customer may receive Internet service at relatively high bandwidth. Accordingly, the CMTS 140, 440 typically transmits and receives data to and from the respective cable modems 120, 420 at the rates associated with the respective customers. The cable modems 120, 420 also may support telephone and television services and may further support such services simultaneously with data communications such as those directed to the Internet.

The CMTS 140, 440 may also transmit control messages to the cable modems. Through the use of such control messages, the CMTS 140, 440 may, for example, adjust parameters of the cable modems, such as phase timing, frequencies and power levels associated with the transfer of data between the respective cable modems and the CMTS 140, 440. For multiple access Internet access over the cable network 130, 430, the CMTS 140, 440 may, for example, provide a specific channel and/or frequency on the upstream channel to respective ones of the cable modems for use in transmitting messages to and receiving messages from the Internet including a channel and/or frequency to support a telephone call. The CMTS 140, 440 may operate to route transmissions over the cable network 130, 430.

It will be understood, by those of skill in the art, that the data transfers between the CMTS 140, 440 and the cable modems may be performed according to standards known in the art. For example, such data transfers may be performed using a time division multiple access (TDMA) technique wherein data is transmitted and received over the cable network using channels identified as a pre-defined time slot or slots at a frequency. The upstream channel may include a plurality of such sub-channels. Standards for the transfer of data in cable systems are discussed in the Data Over Cable System Interface Specification (DOCSIS) published by Cable Television Laboratories Incorporated.

The DOCSIS model will now be further described. Two main elements of the model are the CMTS and the Cable Modem (CM). The CMTS typically interfaces to the cable network, a backbone data network, an Operational Systems and Support system, and a Security Access Controller. The CMTS may control a collection of CMs via the cable network. The CMTS generally controls the configuration, registration and media access of all the CMs under its control. By controlling media access, the CMTS may determine which cable modem gets to transmit, when, and for how long. In other words, the CMTS may control the level of service that the CMs receive. The CMTS may also forward packets between CMs (i.e., CM to CM) and between CMs and the Internet or Intranet. The CM may provide one or more customer devices access to the cable data network. CMs can range from a simple computer interface to supporting a network of computers.

Media Access is typically controlled by the CMTS which issues periodic allocation maps (MAP) defining the usage of each upstream TDMA slot. Time slots can be allocated for:

Contention based requests and short data bursts. Multiple CMs may attempt to send requests for data grants or short data bursts. Some data may be lost due to collisions.

Data grants. The CMTS may allocate slots to a specific CM to transfer packets requiring multiple slots.

Initial Maintenance. These slots allow new CMs to join the network.

Station Maintenance. These slots may be used to perform routine maintenance on CMs such as transmit power adjustment. The allocation of slots to the above categories may depend on the network loading and may be dynamic which may provide the best performance under various conditions. The upstream time slots are generally synchronized with the downstream frames using the Time Sync message. The CMTS may periodically issue this message to provide a slot reference and to synchronize the CM's clock with the information provided in the MAP.

Figure 4:
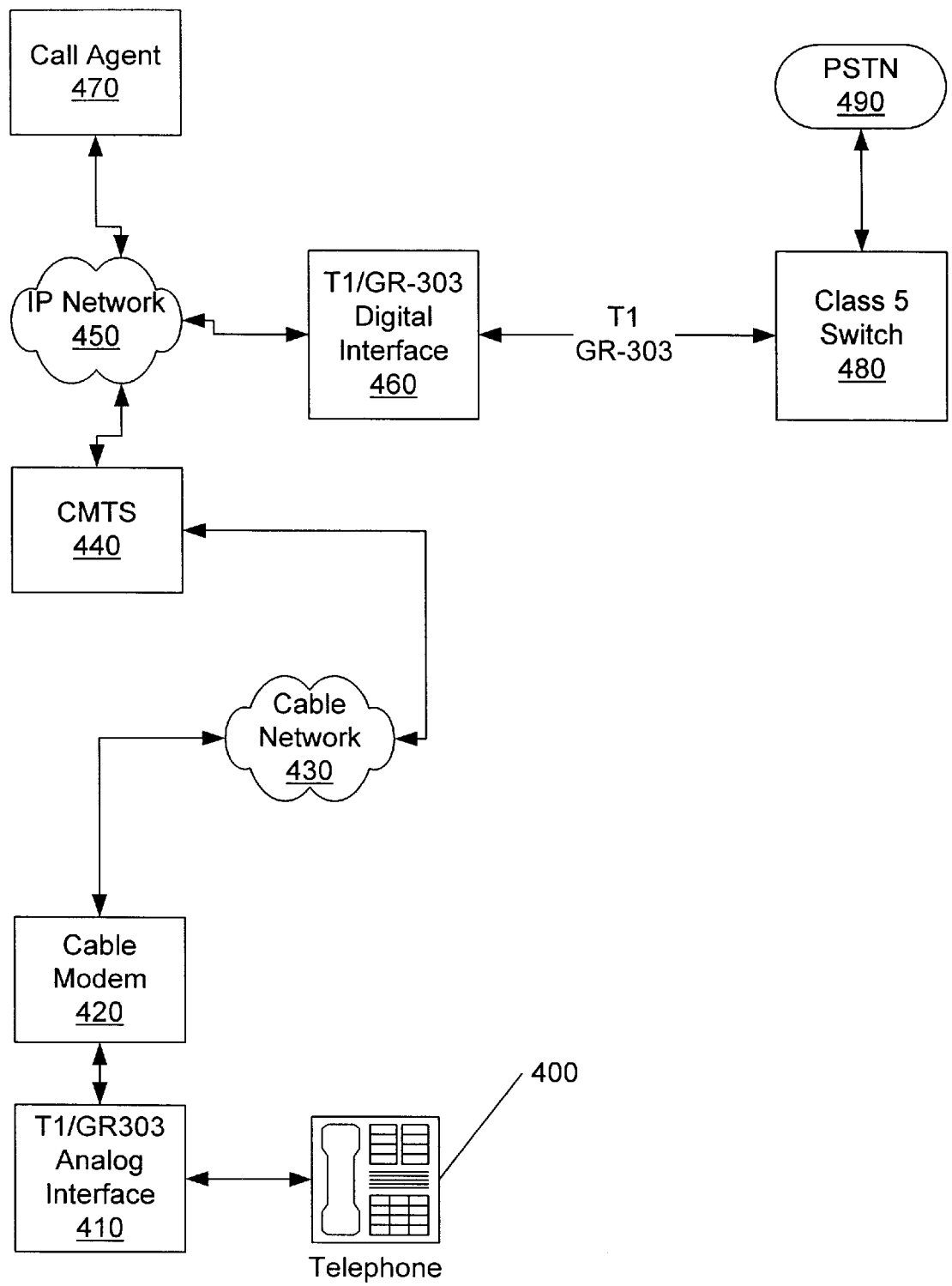
FIG. 4 is a block diagram of a cable telephony system including a call agent which may be used to support embodiments of the present invention.

As seen in FIG. 4, one such system for utilizing a cable system for telephony is illustrated. As seen in FIG. 4, the telephone 400 communicates with a GR-303 analog interface 410 which converts the analog telephone signals to digital signals including the in-band and ABCD signals. The GR-303 analog interface 410 also receives GR-303 digital information and converts it to the analog signals which are provided to the telephone 400. The in-band signals and ABCD signals are sent directly to the GR-303 analog interface 410 as voice packets transmitted as IP messages over the cable system by the GR-303 digital interface 460. The in-band signaling is PCM encoded just like voice and sent on the voice media stream. The ABCD bits are added to the voice packet. The GR-303 analog interface 410 plays out the in-band signals just like voice and converts the ABCD signals to the proper currents and voltages. The voice packets may be transmitted and received over the cable system utilizing the cable modem 420, cable network 430 and CMTS 440 as described above with reference to, for example, the DOCSIS system.

In the system illustrated in FIG. 4, the CA 470 does not attempt to completely control the call. The CA 470 manages and provisions the GR-303 analog interface 410 and starts calls but the Class 5 switch 480 controls the calls once they are started. When the GR-303 analog interface 410 powers up, it communicates with the CA 470 which instructs the GR-303 analog interface 410 to look for an off-hook condition. When the user picks up the telephone 400 to place a call, the GR-303 analog interface 410 detects the off-hook condition and sends a NOTIFY message to the CA 470 as an IP message over the cable system. The CA 470 instructs the GR-303 digital interface 460 to connect to the switch 480 over the T1/GR-303 interface. The CA 470 also sets up an IP connection between the GR-303 analog interface 410 and GR-303 digital interface 460 using the NCS Create Connection command. Once the IP connection is complete and a DS0 is assigned for the call between the GR-303 digital interface 460 and the switch 480, the CA 470 is no longer needed; the switch 480 is in control of the call. The GR-303 analog interface 410 periodically sends data packets containing voice samples and ABCD bit information over the cable system to the GR-303 digital interface 460 which converts the data to the proper format (T1) for transmission to the switch 480. The GR-303 digital interface 460 also converts voice and ABCD bits from the switch 480 to IP packets to send to the GR-303 analog interface 410. The switch 480 generates an in-band dial tone which is packetized and sent directly to the GR-303 analog interface 410, which simply "plays out" the received voice samples.

When the user dials digits, the telephone 400 generates DTMF which the GR-303 analog interface 410 samples and forwards like voice. The GR-303 digital interface 460 receives the forwarded samples and provides them to the switch 480 which interprets the DTMF and places the call. When the caller hangs up, the GR-303 analog interface 410 changes the ABCD bits to indicate "on-hook" and sends the ABCD bits in the next voice packet to the switch 480 through the GR-303 digital interface 460. The switch 480 detects the change in ABCD bits and tears down the call between the GR-303 digital interface 460 and the switch 480. The GR-303 digital interface 460 notifies the CA 470 that the call is complete and the CA 470 deletes the IP connection and instructs the GR-303 analog interface 410 to look for the next "off-hook" condition. Systems such as those illustrated in FIG. 4 are further described in U.S. patent application Ser. No. (09/614,412) entitled, Systems and Methods For Providing Telephony Call Control in a Heterogeneous Network Using a Telephony Switch Interface to a Public Telephony Switch filed concurrently herewith which is hereby incorporated by reference herein as if set forth in its entirety.

Figure 5:
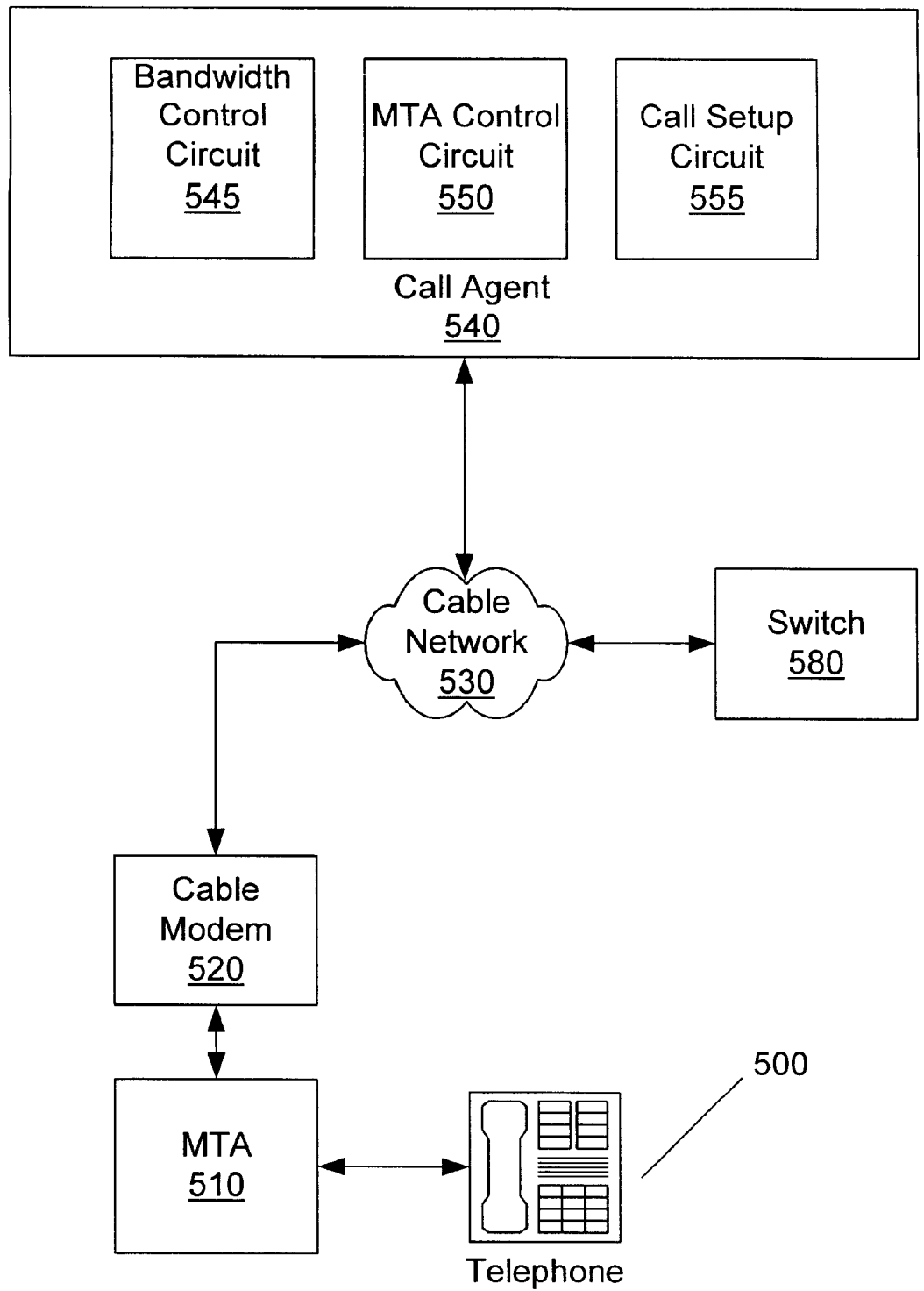
FIG. 5 is a block diagram of a cable telephony system according to embodiments of the present invention.

Referring now to FIG. 5, call agents and systems for providing emergency service on a heterogeneous network, shown as a cable system in FIG. 5, comprising a public switched telephone network (PSTN) and a packet based network to a local user will be further described for embodiments of the present invention. The packet based network to a local user may be, for example, a broadband system such as a cable system, a Local Multi-Point Distribution System (LMDS) type fixed station broadcast system, a digital subscriber link network such as an xDSL network, an IEEE 802.16 based wireless network or the like. As shown in FIG. 5, the cable system includes a call agent 540 coupled to the cable network 530. Note that, while the call agent 540 is shown as connected directly to the cable network 530, it may, in practice, be connected to the cable network 530 through a CMTS and an IP network as illustrated, for example, in FIG. 4. Similarly, while the telephone switch 580 is shown as directly connected to the cable network 530, it may also be coupled in the same manner as the switch 480 illustrated in FIG. 4 by connection over a GR-303 interface to a digital interface then through an IP network and a CMTS to the cable network 530. Similarly, the switch 580 may be connected over a GR-303 interface to a cable telephony gateway such as illustrated in FIG. 3. A user telephone 500 is also connected to the cable network 530 through a MTA 510 and a cable modem 520.

As shown in the embodiments illustrated in FIG. 5, the call agent 540 includes an MTA control circuit 550, a bandwidth control circuit 545 and a call setup circuit 555. The MTA control circuit 550 is configured to receive in-band control signals from one or more MTAs, such as MTA 510, and to provide inband control signals to the MTA 510. The control signals from the MTA 510 may include a request for telephony service and an associated service identifier. The MTA control circuit 550 is further configured to determine if a received request for telephony service is a request for emergency service based on the associated service identifier.

The bandwidth control circuit 545 determines if a portion of the bandwidth of the cable system which is allocated to telephony is fully utilized. Operations related to determining utilization of bandwidth in a cable system, for example through a CMTS, are generally understood to those of ordinary skill in the art and will not be further described herein.

The call setup circuit 555, as illustrated in FIG. 5, obtains a portion of the bandwidth of the cable system to provide a requested telephony service if the request for telephony service is a request for emergency service and the portion of the bandwidth of the cable system which is allocated to telephony is fully utilized. The call setup circuit 555 is further configured to establish a connection between the MTA 510 and the telephone switch 580 to support the requested emergency service using the obtained portion of the bandwidth of the cable system. The telephone switch 580 may be an in-band control architecture switch system, such as a class 5 switch communicating with the cable system using GR-303 connections.

In various embodiments of the present invention, the call setup circuit 555 is configured to allocate an alternate portion of the bandwidth of the cable system which is not allocated to telephony to a request for telephony service. In further embodiments, the call setup circuit 555 is configured to pre-empt a part of the portion of the bandwidth of the cable system which is allocated to telephony. The MTA control circuit 550 may be configured to request, responsive to the call setup circuit 555, that the MTA 510 provide the received dialed digits from a user telephone 500 to the telephone switch 580 using the obtained bandwidth, such as the allocated alternate portion of the bandwidth or the preempted part of the portion of the bandwidth of the cable system which is allocated to telephony.

MTA control circuit 550 may be configured to provide a dial tone request to the MTA 510 regardless of whether a portion of the bandwidth of the cable system which is allocated to telephony is fully utilized and to receive dialed digits as the associated service identifier for a call request from the MTA 510 responsive to the provided dial tone request. In other words, as will be described further with respect to the flowchart illustrations of FIGS. 6 through 8, the call agent 540 may be configured to obtain dialed digits to identify a request for an emergency call by requesting that the MTA 510 provide a user of the telephone 500, a dial tone even when the cable telephony bandwidth is fully utilized.

As will be appreciated by those of skill in this art, the above-described aspects of the present invention described with reference to the block diagram illustrations of FIG. 4 and FIG. 5 may be provided by hardware, software, or a combination of the above. For example, while various components of the call agent 540 have been illustrated in FIG. 5, in part, as discrete elements, they may, in practice, be implemented by a microcontroller including input and output ports and running software code, by custom or hybrid chips, by discrete components or by a combination of the above which, thus, provide a "circuit" as that term is used herein. For example, the bandwidth control circuit 545, the MTA control circuit 550 and the call setup circuit 555 may be implemented in part or entirely as code executing on a processor. Furthermore, aspects of the code may be distributed across a number of different processor devices which may interface over a computer network to provide a corresponding circuit for providing emergency services on a cable system.

Figure 7:
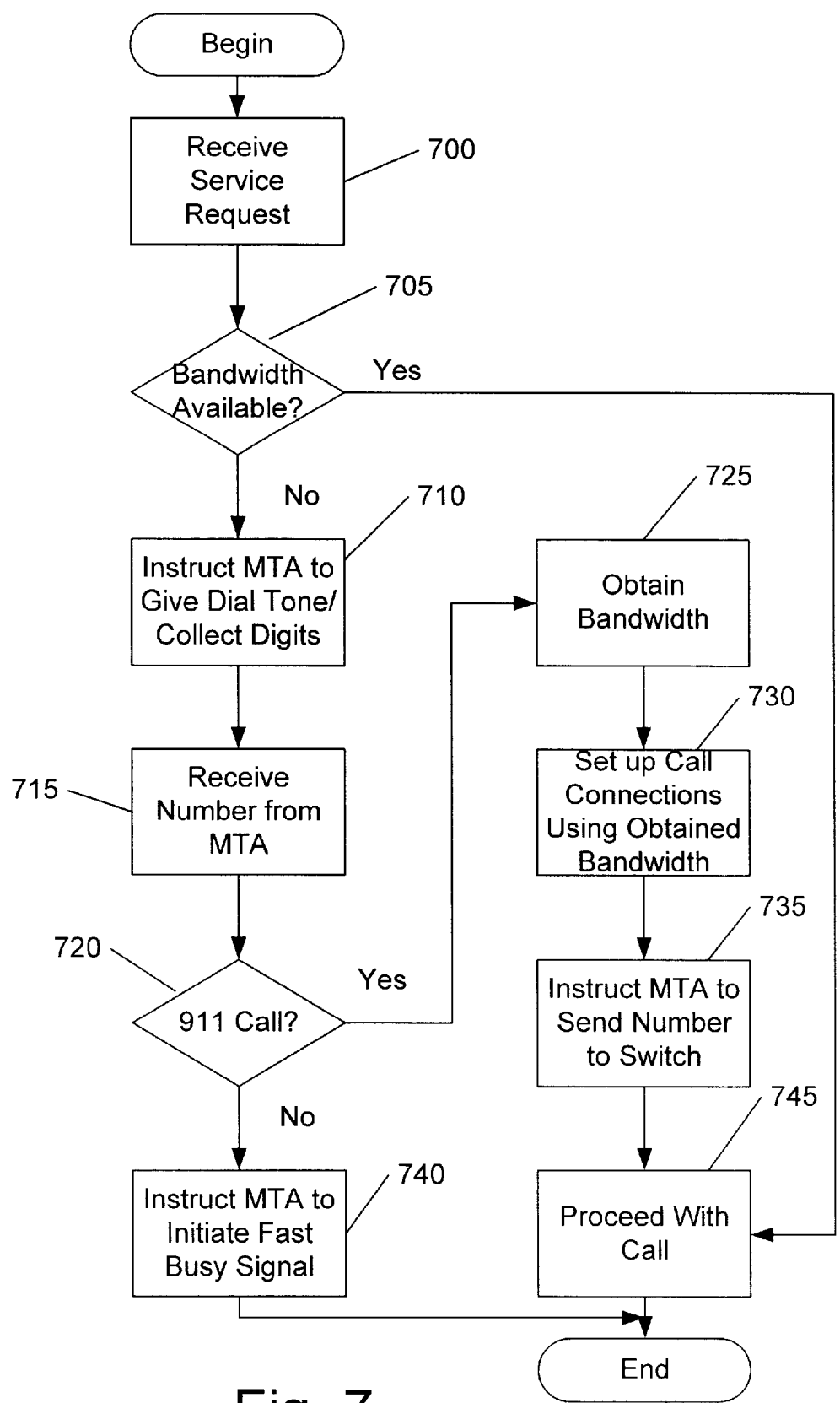
FIG. 7 is a flowchart illustrating operations for providing emergency services according to further embodiments of the present invention from the perspective of a cable system.
Figure 8:
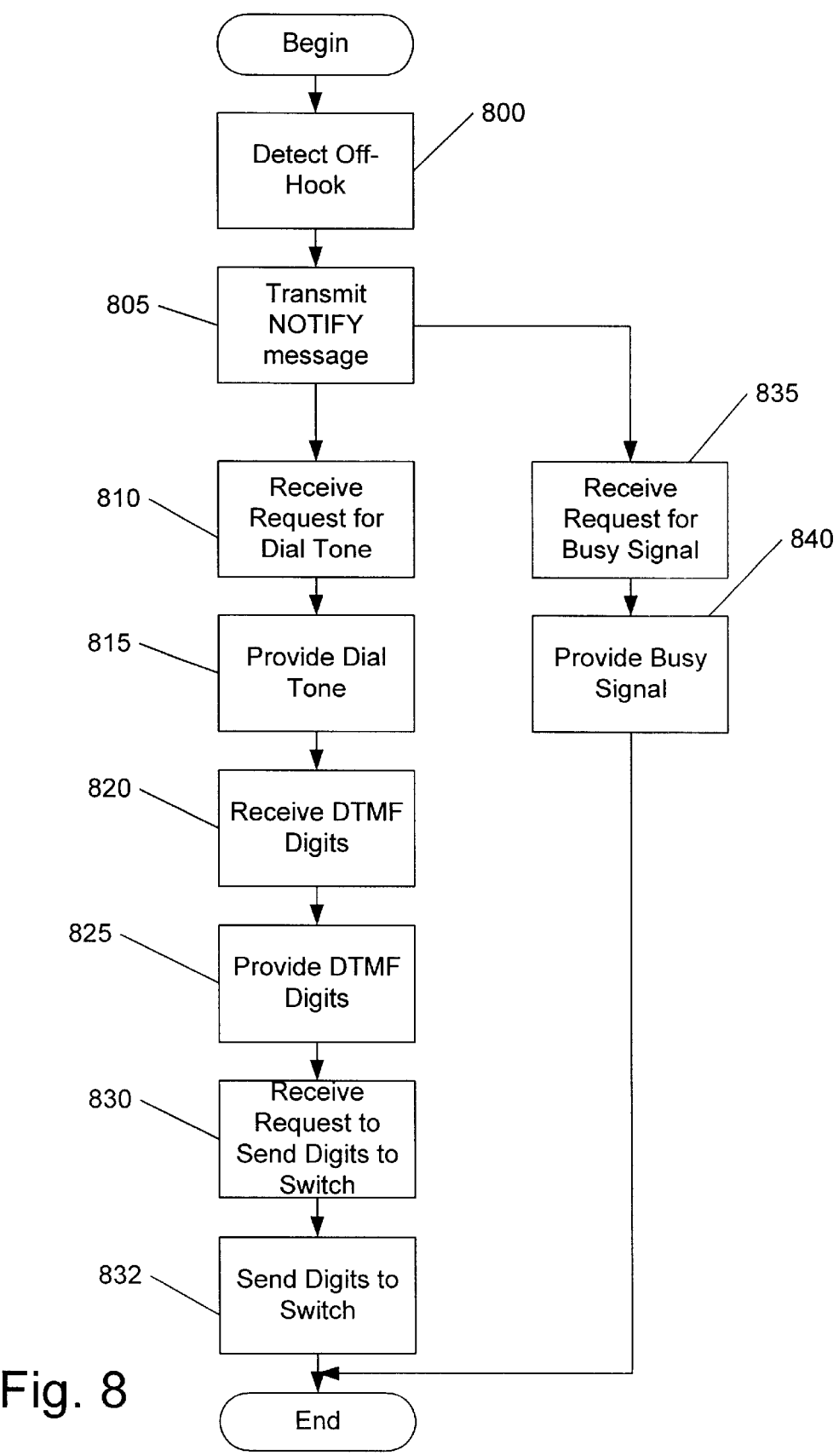
FIG. 8 is a flowchart illustrating operations for providing emergency services according to further embodiments of the present invention from the perspective of a user station.

Operations of the present invention will now be described with respect to the flowchart illustrations of FIG. 6 through FIG. 8. It will be understood that each block of the flowchart illustrations and/or the schematic block diagrams of FIG. 4 and FIG. 5, and combinations of blocks in the flowchart illustrations and schematic diagrams, can be implemented by computer program instructions. These program instructions may be provided to a processor to produce a machine, such that the instructions which execute on the processor create means for implementing the functions specified in the flowchart and/or schematic diagram block or blocks. The computer program instructions may be executed by a processor to cause a series of operational steps to be performed by the processor to produce a computer implemented process such that the instructions which execute on the processor provide steps for implementing the functions specified in the flowchart and/or schematic diagram block or blocks.

Accordingly, blocks of the flowchart illustrations and/or schematic block diagrams support combinations of means for performing the specified functions, combinations of steps for performing the specified functions and program instruction means for performing the specified functions. It will also be understood that each block of the flowchart illustrations and/or schematic diagrams, and combinations of blocks in the flowchart illustrations and/or schematic diagrams, can be implemented by special purpose hardware-based systems which perform the specified functions or steps, or combinations of special purpose hardware and computer instructions.

Figure 6:
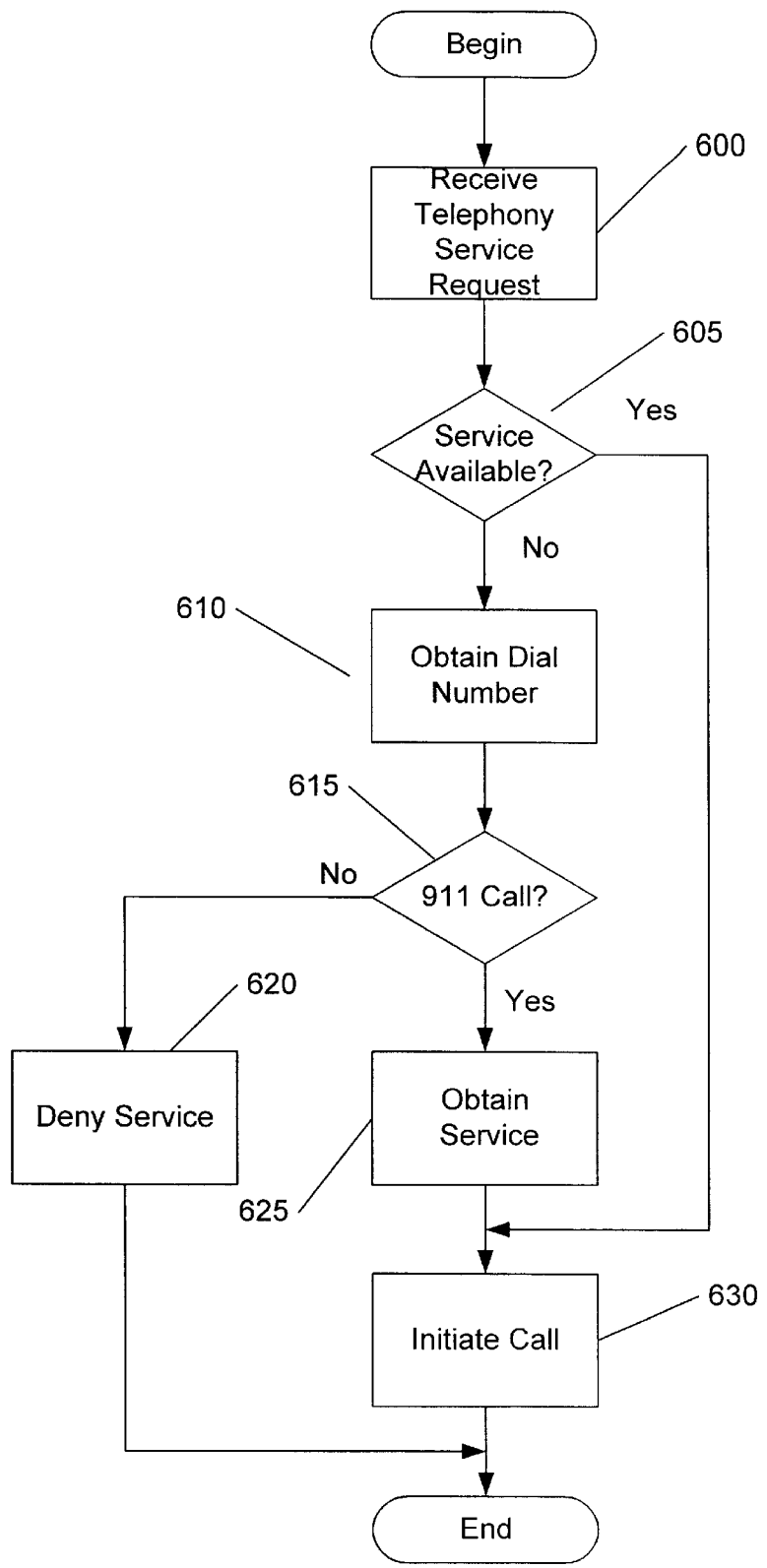
FIG. 6 is a flowchart illustrating operations for providing emergency services according to embodiments of the present invention.

Referring now to the flowchart illustration of FIG. 6, operations according to embodiments of the present invention for providing emergency services begin at block 600 when a request for telephony service is received. For example, a user may pick up the receiver of the telephone 500 and the MTA 510 may then detect the off-hook condition. More particularly, the received request for telephony service is for a telephony service which will be provided over a cable system.

Figure 3:
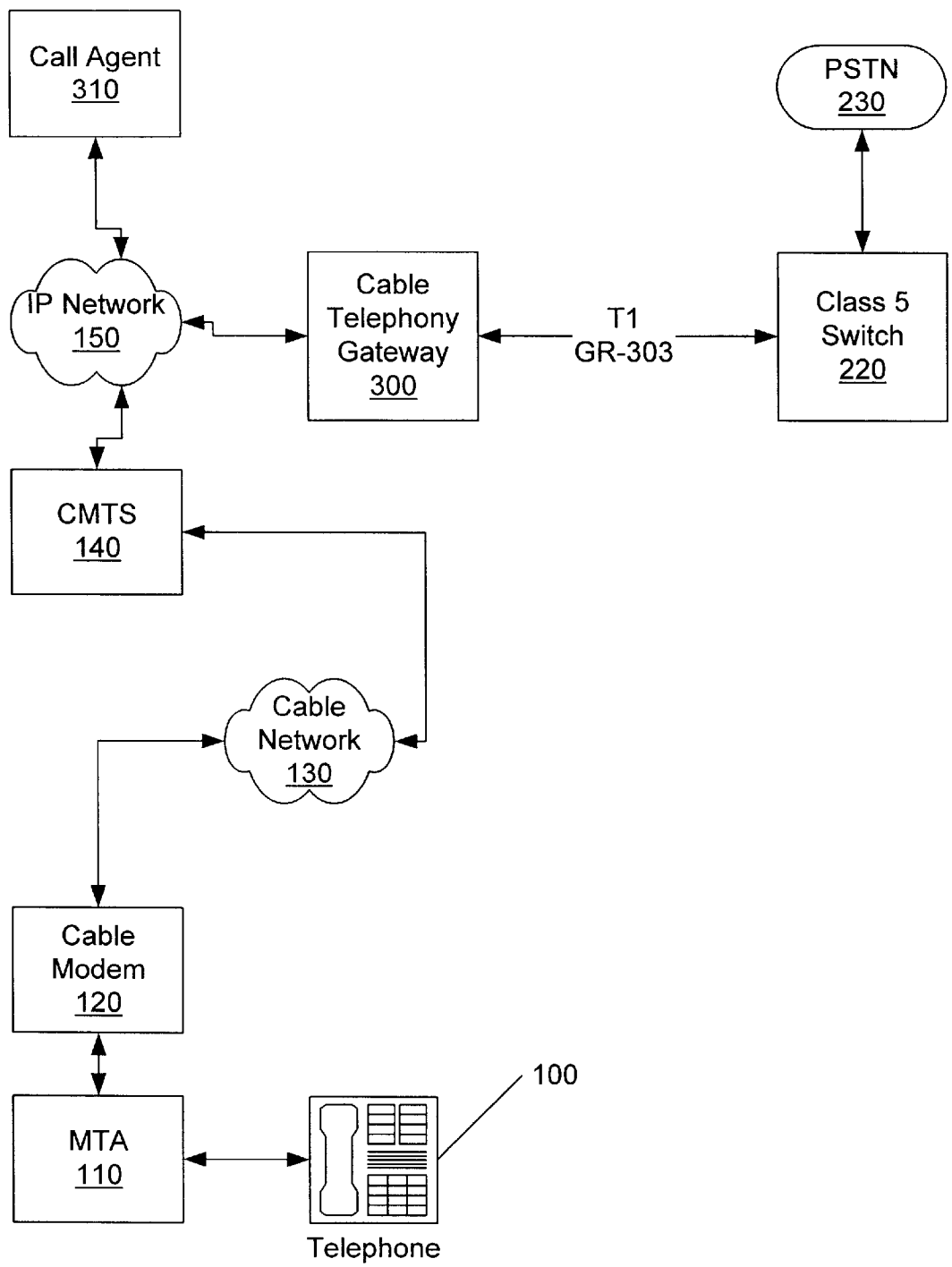
FIG. 3 is a block diagram of a cable telephony system connected to a Class 5 switch according to the prior art.

The cable telephony system in various embodiments of the present invention has an in-band control architecture such as that provided for the systems illustrated in FIGS. 3 and 4, as contrasted with an out-of-band control architecture as utilized by SS7 systems, such as those illustrated in FIG. 1. With an out-of-band system such as SS7, a portion of bandwidth is typically always available for control signal communications and separately allocated from the bandwidth utilized for supporting telephone call services. Thus, control communications are generally supported by SS7 systems having out-of-band control architectures such as that illustrated in FIG. 1 even when the bandwidth allocated to telephony call support is fully utilized as contrasted with an in-band architecture where both the calls and the control communications are provided within the bandwidth allocated to telephony call support.

The emergency service requested by a user may be an emergency call and the telephony service may be a voice call service. The MTA 510 may, thus, provide a user station which provides request for telephony service to the cable system through the call agent 540.

The call agent 540, for example, working with the CMTS 440, determines if a portion of the bandwidth of the cable system which is allocated to telephony is fully utilized to determine if service is available (block 605). If service is available (block 605), operations proceed normally with initiation of the call (block 630). If service is not available (block 605), the call agent 540 determines if the request for telephony service is a request for emergency service (block 615), for example, by obtaining a dialed number from a user of telephone 500 through the MTA 510 (block 610) and determining if the obtained number is associated with an emergency service.

If the obtained number indicates that the service request is not for an emergency service such as a 911 call (block 615), service is denied (block 620). If the request for telephony service is a request for emergency service (block 615), a portion of the bandwidth of the cable system is obtained to provide the requested telephony service (block 625). The bandwidth may be obtained at block 625 by allocating an alternate portion of the bandwidth of the cable system which is not allocated to telephony to the request for telephony service. For example, a portion of the bandwidth of the cable system associated with data services on the cable system may be allocated to a request for telephony service. Operations for obtaining bandwidth at block 625 may also be provided by pre-empting a part of the portion of the bandwidth of the cable system which is allocated to telephony. For example, at least one call which is utilizing the portion of the bandwidth of the cable system which is allocated to telephony may be terminated to free up bandwidth for servicing the emergency service request. Alternatively, the bandwidth allocated to at least one such call may be reduced, for example, by utilizing a lower bit rate voice coder/decoder. Once bandwidth is obtained, the requested emergency service is provided by initiating the call using the obtained portion of the bandwidth of the cable system (block 630).

Operations according to embodiments of the present invention for providing emergency services will now be further described with reference to the cable system or call agent 540 with respect to FIG. 7 and further with reference to the user station or MTA 510 referring to FIG. 8. Referring first to the flowchart illustration of embodiments of the present invention in FIG. 7, operations begin at block 700 when a service request is received from a user station, such as the MTA 510. For example, in a GR-303 system, the received service request may be a NOTIFY message. If it is determined that the portion of the bandwidth of the cable system which is allocated to the cable telephony services is not fully utilized (block 705), operations can proceed normally with initiation of the call (block 745). If it is determined that the portion of the bandwidth of the cable system which is allocated to the cable telephony services is fully utilized (i.e., no bandwidth is available) (block 705), a request to provide a dial tone is transmitted to the user station (block 710). Note that such a request to provide a dial tone is part of normal operations for architectures such as that illustrated in FIG. 3 and, accordingly, as illustrated in the embodiments shown in FIG. 7, the request to provide a dial tone may be transmitted to the user station responsive to the received service request regardless of whether the portion of the bandwidth of the cable system which is allocated to the cable telephony services is fully utilized. For the architecture illustrated in FIG. 4, the request to provide a dial tone may be provided either as described with reference to the architecture of FIG. 3 or as a PCM encoded dial tone provided by the switch 480.

A number associated with a service request is received from the user station (block 715). For example, the MTA 510 may provide a number associated with a service request as a NOTIFY message containing the dialed digits. If the received number is not an emergency call number associated with an emergency call service, for example, not a 911 call number (block 720), operations proceed to block 740 and a request to provide a system busy signal, such as a "fast busy" signal, to the user station is transmitted. If the received number is an emergency call number associated with the emergency call service (block 720), bandwidth is obtained to support the requested emergency service (block 725). The bandwidth may be obtained by allocating a portion of the bandwidth of the cable system which is not allocated to the cable telephony system to the service request or, alternatively, by pre-empting a part of the portion of the bandwidth of the cable system which is allocated to telephony.

A connection is established between the user station, such as the MTA 510 and a telephone switch, such as the telephone switch 580, using the obtained portion of the bandwidth of the cable system (block 730). For example, the call agent 540 may setup Internet protocol (IP) and GR-303 connections to establish a connection for a system such as those illustrated in FIG. 3 and FIG. 4. A request is transmitted to the user station requesting transmission of a received number to the telephone switch 580 using the obtained portion of the bandwidth of the cable system (block 735). The received number may be transmitted from the user station to the telephone switch 580 using the connection established at block 730.

Referring now to the flowchart illustration of FIG. 8, embodiments of the present invention for providing emergency call service on a cable telephony system will be further described with reference to operations by a user station, such as the MTA 510. Operations begin at block 800 with detection of an offhook condition from a user, for example, a user lifting the handset of the telephone 500. A message, for example, a NOTIFY message, is sent from the MTA 510 to the cable telephony system, for example, to the call agent 540, as a telephony service request (block 805). Subsequently, the MTA 510 receives either a request to provide a dial tone (block 810) or a request to provide a system busy signal, such as a "fast busy" signal, to the user through the telephone 500 (block 835). For example, a request to provide a busy signal may be provided where there is no bandwidth available for cable telephony services and the requested service is not an emergency service as was described generally with reference to FIG. 7 above. A system busy signal is provided to the user through the telephone 500 responsive to a received request to provide a busy signal to the user (block 840). A user may, thus, be notified that the cable telephony system is busy.

When a request to provide a dial tone is received (block 810), the MTA 510 provides a dial tone to a user through the telephone 500 responsive to the received request to provide a dial tone (block 815). The MTA 510 receives dial digits, such as dual tone, multi-frequency (DTMF) digits from the user through the telephone 500 (block 820). The received DTMF digits are provided to the cable telephony system, for example, through the call agent 540, as a number associated with the telephony service request from the user of the telephone 500 (block 825). The number may be encoded as a digital message as contrasted with transmitting the DTMF tones. As noted with reference to the discussion of FIG. 7, the provided DTMF digits may be used by the call agent 540 to determine if the service request is for an emergency service.

The MTA 510 may subsequently receive a request to provide the received DTMF number from the MTA 510 to the switch 580 (block 830). The number may then be transmitted to the switch 580 (block 832). The number may be provided to the switch 580 by playing the DTMF tones rather than encoding the DTMF signals as numbers in a digital message as was described above for providing the DTMF number to the CA 540. As described previously, the number may be provided from the MTA 510 to the switch 580 using a channel established by the call agent 540 by setting up IP and GR-303 connections. The call may then proceed normally.

In various embodiments of the present invention, the MTA 510 suppresses communication of the number to a user of the telephone 500 while transmitting the received number from the MTA 510 to the telephone switch 580. By suppressing communication of the transmitted digits from the MTA 510 to the telephone switch 580, a user of the telephone 500 may not even be notified that a re-dial has occurred, thus providing the appearance of a normal telephone connection without ever providing a system busy signal to the user of the telephone 500.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for providing emergency service on a heterogeneous network comprising a public switched telephone network (PSTN) and a packet based network to a local user, the packet based network having a bandwidth, the method comprising the steps of:

receiving a request for telephony service wherein the telephony service will be provided over the packet based network;

determining if a portion of the bandwidth of the packet based network which is allocated to telephony is fully utilized;

determining if the request for telephony service is a request for emergency service;

obtaining a portion of the bandwidth of the packet based network to provide the requested telephony service if the request for telephony service is a request for emergency service and the portion of the bandwidth of the packet based network which is allocated to telephony is fully utilized; and providing the requested emergency service using the obtained portion of the bandwidth of the packet based network.

2. The method of claim 1 wherein the step of obtaining a portion of the bandwidth of the packet based network comprises the step of allocating an alternate portion of the bandwidth of the packet based network which is not allocated to telephony to the requested telephony service if the request for telephony service is a request for emergency service and the portion of the bandwidth of the packet based network which is allocated to telephony is fully utilized and wherein the step of providing the requested emergency service comprises the step of providing the requested emergency service using the allocated alternate portion of the bandwidth of the packet based network.

3. The method of claim 2 wherein the packet based network comprises a cable system including a cable telephony system having an in-band control architecture and wherein the telephony service comprises a voice call service and the emergency service comprises an emergency call.

4. The method of claim 3 wherein the step of receiving a request for telephony service comprises the step of receiving a request for telephony service from a user station.

5. The method of claim 4 wherein the user station comprises a media terminal adapter.

6. The method of claim 4 wherein the step of determining if the request for telephony service is a request for emergency service further comprises the steps of:

providing a dial tone to a user regardless of whether the portion of the bandwidth of the cable system which is allocated to telephony is fully utilized;

receiving a number associated with the requested voice call service from the user station; and determining if the received number is an emergency call number.

7. The method of claim 6 wherein the emergency call number is 911.

8. The method of claim 6 wherein the step of allocating an alternate portion of the bandwidth of the cable system further comprises the step of allocating a portion of the bandwidth of the cable system associated with data services on the cable system to the requested telephony service if the request for telephony service is a request for emergency service and the portion of the bandwidth of the cable system which is allocated to telephony is fully utilized.

9. The method of claim 8 wherein the step of providing the requested emergency service using the allocated alternate portion of the bandwidth of the cable system further comprises the steps of:

transmitting the received number from the user station to a telephone switch; and providing the emergency service using the allocated alternate portion of the bandwidth of the cable system to support communications between the user station and the telephone switch.

10. The method of claim 9 wherein the step of transmitting the received number from the user station to a telephone switch is preceded by the step of establishing a connection between the user station and the telephone switch using the allocated alternate portion of the bandwidth of the cable system and wherein the step of transmitting the received number from the user station to a telephone switch further comprises the step of transmitting the received number from the user station to the telephone switch using the established connection.

11. The method of claim 10 further comprising the step of suppressing communication of the received number to a user of the user station while transmitting the received number from the user station to the telephone switch.

12. The method of claim 3 wherein the step of allocating an alternate portion of the bandwidth of the cable system further comprises the step of allocating a portion of the bandwidth of the cable system associated with data services on the cable system to the requested telephony service if the request for telephony service is a request for emergency service and the portion of the bandwidth of the cable system which is allocated to telephony is fully utilized.

13. The method of claim 4 wherein the step of providing the requested emergency service using the allocated alternate portion of the bandwidth of the cable system further comprises the steps of:

transmitting the received number from the user station to a telephone switch; and then providing the emergency service using the allocated alternate portion of the bandwidth of the cable system to support communications between the user station and the telephone switch.

14. The method of claim 1 wherein the step of obtaining a portion of the bandwidth of the packet based network comprises the step of pre-empting a part of the portion of the bandwidth of the packet based network which is allocated to telephony if the request for telephony service is a request for emergency service and the portion of the bandwidth of the packet based network which is allocated to telephony is fully utilized and wherein the step of providing the requested emergency service comprises the step of providing the requested emergency service using the pre-empted part of the portion of the bandwidth of the packet based network.

15. The method of claim 14 wherein the packet based network comprises a cable system including a cable telephony system having an in-band control architecture and wherein the telephony service comprises a voice call service and the emergency service comprises an emergency call.

16. The method of claim 15 wherein the step of determining if the request for telephony service is a request for emergency service further comprises the steps of:

providing a dial tone to a user station requesting the telephony service regardless of whether the portion of the bandwidth of the cable system which is allocated to telephony is fully utilized;

receiving a number associated with the requested voice call service from the user station; and determining if the received number is an emergency call number.

17. The method of claim 16 wherein the step of providing the requested emergency service using the pre-empted part of the portion of the bandwidth of the cable system further comprises the steps of:

transmitting the received number from the user station to the telephone switch; and providing the emergency service using the pre-empted part of the portion of the bandwidth of the cable system to support communications between the user station and the telephone switch.

18. The method of claim 17 further comprising the step of suppressing communication of the received number to a user of the user station while transmitting the received number from the user station to the telephone switch.

19. The method of claim 16 wherein the step of pre-empting a part of the portion of the bandwidth of the cable system which is allocated to telephony further comprises the step of terminating at least one call which is utilizing the portion of the bandwidth of the cable system which is allocated to telephony if the request for telephony service is a request for emergency service and the portion of the bandwidth of the cable system which is allocated to telephony is fully utilized.

20. The method of claim 16 wherein the step of preempting a part of the portion of the bandwidth of the cable system which is allocated to telephony further comprises the step of reducing a bandwidth allocated to at least one call which is utilizing the portion of the bandwidth of the cable system which is allocated to telephony if the request for telephony service is a request for emergency service and the portion of the bandwidth of the cable system which is allocated to telephony is fully utilized.

21. A method for providing emergency call service on a cable telephony system having an in-band control architecture, the method comprising the steps of:

detecting an off-hook signal from a user;

transmitting a service request to the cable telephony system responsive to the detected off-hook condition;

receiving a request to provide a dial tone to the user from the cable telephony system responsive to the transmitted service request;

providing a dial tone to the user responsive to the request to provide a dial tone;

receiving a number associated with the emergency call service from the user;

providing the received number associated with the emergency call service to the cable telephony system;

receiving an allocation of a portion of the bandwidth of the cable telephony system which is not allocated to telephony from the cable telephony system; and transmitting the received number to a telephone switch using the received allocation of a portion of the bandwidth of the cable telephony system to initiate the emergency call service.

22. The method of claim 21 further comprising the steps of:

receiving a number not associated with the emergency call service from the user;

providing the received number not associated with the emergency call service to the cable telephony system;

receiving a denial of service from the cable telephony system; and providing a denial of service indication to the user responsive to the received denial of service.

23. The method of claim 21 further comprising the step of suppressing communication of the received number associated with the emergency call service to the user while transmitting the received number to the telephone switch.

24. A method for providing emergency call service on a cable telephony system having an in-band control architecture, the method comprising the steps of:

receiving a service request from a user station;

determining if a portion of the bandwidth of a cable system which is allocated to the cable telephony system is fully utilized;

transmitting a request to provide a dial tone to the user station responsive to the received service request regardless of whether the portion of the bandwidth of the cable system which is allocated to the cable telephony system is fully utilized;

receiving a number associated with the service request from the user station;

determining if the received number is an emergency call number associated with the emergency call service;

allocating a portion of the bandwidth of the cable system which is not allocated to the cable telephony to the service request if the received number is an emergency call number associated with the emergency call service and the portion of the bandwidth of the cable system which is allocated to the cable telephony system is fully utilized;

establishing a connection between the user station and a telephone switch using the allocated portion of the bandwidth of the cable system;

transmitting a request to the user station requesting transmission of the received number to the telephone switch using the allocated portion of the bandwidth of the cable system; and transmitting a request to provide a busy signal to the user station if the received number is not an emergency call number associated with the emergency call service and the portion of the bandwidth of the cable system which is allocated to the cable telephony system is fully utilized.

25. The method of claim 24 wherein the cable telephony system is GR-303 based and wherein the step of establishing a connection further comprises the step of setting up Internet Protocol (IP) and GR-303 connections.

26. The method of claim 25 wherein the user station is a media terminal adapter and wherein the step of receiving a service request is preceded by the steps performed by the media terminal adapter of:

detecting an off-hook condition from a user; and transmitting a notify message to the cable telephony system as the service request; and wherein the step of transmitting a request to provide a dial tone to the user station is followed by the steps performed by the media terminal adapter of:

receiving the request to provide a dial tone;

providing a dial tone to the user responsive to the received request to provide a dial tone; and then receiving dual tone multi-frequency (DTMF) digits from the user; and providing the received DTMF digits to the cable telephony system as the number associated with the service request; and wherein the step of transmitting a request to provide a busy signal to the user station is followed by the steps performed by the media terminal adapter of:

receiving the request to provide a busy signal to the user; and providing a system busy signal to the user responsive to the received request to provide a busy signal to the user.

27. A method for providing emergency call service on a cable telephony system having an in-band control architecture, the method comprising the steps of:

receiving a service request from a user station;

determining if a portion of the bandwidth of a cable system which is allocated to the cable telephony system is fully utilized;

transmitting a request to provide a dial tone to the user station responsive to the received service request regardless of whether the portion of the bandwidth of the cable system which is allocated to the cable telephony system is fully utilized;

receiving a number associated with the service request from the user station;

determining if the received number is an emergency call number associated with the emergency call service;

pre-empting a part of the portion of the bandwidth of the cable system which is allocated to telephony if the received number is an emergency call number associated with the emergency call service and the portion of the bandwidth of the cable system which is allocated to the cable telephony system is fully utilized;

establishing a connection between the user station and a telephone switch using the pre-empted part of the portion of the bandwidth of the cable system;

transmitting a request to the user station requesting transmission of the received number to the telephone switch using the preempted part of the portion of the bandwidth of the cable system; and transmitting a request to provide a busy signal to the user station if the received number is not an emergency call number associated with the emergency call service and the portion of the bandwidth of the cable system which is allocated to the cable telephony system is fully utilized.

28. The method of claim 27 wherein the cable telephony system is GR-303 based and wherein the step of establishing a connection further comprises the step of setting up Internet Protocol (IP) and GR-303 connections.

29. The method of claim 28 wherein the user station is a media terminal adapter and wherein the step of receiving a service request is preceded by the steps performed by the media terminal adapter of:

detecting an off-hook condition from a user; and transmitting a notify message to the cable telephony system as the service request; and wherein the step of transmitting a request to provide a dial tone to the user station is followed by the steps performed by the media terminal adapter of:

receiving the request to provide a dial tone;

providing a dial tone to the user responsive to the received request to provide a dial tone; and then receiving dual tone multi-frequency (DTMF) digits from the user; and providing the received DTMF digits to the cable telephony system as the number associated with the service request; and wherein the step of transmitting a request to provide a busy signal to the user station is followed by the steps performed by the media terminal adapter of:

receiving the request to provide a busy signal to the user; and providing a system busy signal to the user responsive to the received request to provide a busy signal to the user.

30. A call agent for a cable system having a bandwidth, the call agent comprising:

a media terminal adapter (MTA) control circuit that receives in-band control signals from a MTA and provides in-band control signals to the MTA, the control signals from the MTA including a request for telephony service and an associated service identifier, the MTA control circuit being configured to determine if a received request for telephony service is a request for emergency service based on the associated service identifier;

a bandwidth control circuit that determines if a portion of the bandwidth of the cable system which is allocated to telephony is fully utilized; and a call setup circuit that obtains a portion of the bandwidth of the cable system to provide the requested telephony service if the request for telephony service is a request for emergency service and the portion of the bandwidth of the cable system which is allocated to telephony is fully utilized, the call setup circuit being configured to establish a connection between the MTA and a telephone switch to support the requested emergency service using the obtained portion of the bandwidth of the cable system.

31. The call agent of claim 30 wherein the call setup circuit is configured to allocate an alternate portion of the bandwidth of the cable system which is not allocated to telephony to the requested telephony service if the request for telephony service is a request for emergency service and the portion of the bandwidth of the cable system which is allocated to telephony is fully utilized.

32. The call agent of claim 31 wherein the MTA control circuit is configured to provide a dial tone request to the MTA regardless of whether a portion of the bandwidth of the cable system which is allocated to telephony is fully utilized and to receive dialed digits as the associated service identifier from the MTA responsive to the provided dial tone request.

33. The call agent of claim 32 wherein the MTA control circuit is configured to request, responsive to the call setup circuit, that the MTA provide the received dialed digits to the telephone switch using the allocated alternate portion of the bandwidth.

34. The call agent of claim 30 wherein the call setup circuit is configured to pre-empt a part of the portion of the bandwidth of the cable system which is allocated to telephony if the request for telephony service is a request for emergency service and the portion of the bandwidth of the cable system which is allocated to telephony is fully utilized.

35. The call agent of claim 34 wherein the MTA control circuit is configured to provide a dial tone request to the MTA regardless of whether a portion of the bandwidth of the cable system which is allocated to telephony is fully utilized and to receive dialed digits as the associated service identifier from the MTA responsive to the provided dial tone request.

36. The call agent of claim 35 wherein the MTA control circuit is configured to request, responsive to the call setup circuit, that the MTA provide the received dialed digits to the telephone switch using the pre-empted part of the portion of the bandwidth of the cable system which is allocated to telephony.

37. A system for providing emergency service on a heterogeneous network comprising a public switched telephone network (PSTN) and a packet based network to a local user, the packet based network to the local user having a bandwidth, the system comprising:

means for receiving a request for telephony service wherein the telephony service will be provided over the packet based network;

means for determining if a portion of the bandwidth of the packet based network which is allocated to telephony is fully utilized;

means for determining if the request for telephony service is a request for emergency service;

means for obtaining a portion of the bandwidth of the packet based network to provide the requested telephony service if the request for telephony service is a request for emergency service and the portion of the bandwidth of the packet based network which is allocated to telephony is fully utilized; and means for providing the requested emergency service using the obtained portion of the bandwidth of the packet based network.

38. The system of claim 37 wherein the packet based network to a local user comprises a cable system.

39. The system of claim 38 wherein the means for obtaining a portion of the bandwidth of the cable system comprises means for allocating an alternate portion of the bandwidth of the cable system which is not allocated to telephony to the requested telephony service if the request for telephony service is a request for emergency service and the portion of the bandwidth of the cable system which is allocated to telephony is fully utilized and wherein the means for providing the requested emergency service comprises means for providing the requested emergency service using the allocated alternate portion of the bandwidth of the cable system.

40. The system of claim 38 wherein the means for obtaining a portion of the bandwidth of the cable system comprises means for pre-empting a part of the portion of the bandwidth of the cable system which is allocated to telephony if the request for telephony service is a request for emergency service and the portion of the bandwidth of the cable system which is allocated to telephony is fully utilized and wherein the means for providing the requested emergency service comprises means for providing the requested emergency service using the pre-empted part of the portion of the bandwidth of the cable system.

41. A system for providing emergency call service on a cable telephony system having an in-band control architecture, the system comprising:
  means for detecting an off-hook signal from a user;
  means for transmitting a service request to the cable telephony system responsive to the detected off-hook condition;
  means for receiving a request to provide a dial tone to the user from the cable telephony system responsive to the transmitted service request;
  means for providing a dial tone to the user responsive to the request to provide a dial tone;
  means for receiving a number associated with the emergency call service from the user;
  means for providing the received number associated with the emergency call service to the cable telephony system;
  means for receiving an allocation of a portion of the bandwidth of the cable telephony system which is not allocated to telephony from the cable telephony system; and
  means for transmitting the received number to a telephone switch using the received allocation of a portion of the bandwidth of the cable telephony system to initiate the emergency call service.

42. A system for providing emergency call service on a cable telephony system having an in-band control architecture, the system comprising:
  means for receiving a service request from a user station;
  means for determining if a portion of the bandwidth of a cable system which is allocated to the cable telephony system is fully utilized;
  means for transmitting a request to provide a dial tone to the user station responsive to the received service request regardless of whether the portion of the bandwidth of the cable system which is allocated to the cable telephony system is fully utilized;
  means for receiving a number associated with the service request from the user station;
  means for determining if the received number is an emergency call number associated with the emergency call service;
  means for allocating a portion of the bandwidth of the cable system which is not allocated to the cable telephony to the service request if the received number is an emergency call number associated with the emergency call service and the portion of the bandwidth of the cable system which is allocated to the cable telephony system is fully utilized;
  means for establishing a connection between the user station and a telephone switch using the allocated portion of the bandwidth of the cable system;
  means for transmitting a request to the user station requesting transmission of the received number to the telephone switch using the allocated portion of the bandwidth of the cable system; and
  means for transmitting a request to provide a busy signal to the user station if the received number is not an emergency call number associated with the emergency call service and the portion of the bandwidth of the cable system which is allocated to the cable telephony system is fully utilized.

43. The system of claim 42 wherein the cable telephony system is GR-303 based and wherein the means for establishing a connection further comprises means for setting up Internet Protocol (IP) and GR-303.

44. A system for providing emergency call service on a cable telephony system having an in-band control architecture, the system comprising:
  means for receiving a service request from a user station;
  means for determining if a portion of the bandwidth of a cable system which is allocated to the cable telephony system is fully utilized;
  means for transmitting a request to provide a dial tone to the user station responsive to the received service request regardless of whether the portion of the bandwidth of the cable system which is allocated to the cable telephony system is fully utilized;
  means for receiving a number associated with the service request from the user station;
  means for determining if the received number is an emergency call number associated with the emergency call service;
  means for preempting a part of the portion of the bandwidth of the cable system which is allocated to telephony if the received number is an emergency call number associated with the emergency call service and the portion of the bandwidth of the cable system which is allocated to the cable telephony system is fully utilized;
  means for establishing a connection between the user station and a telephone switch using the preempted part of the portion of the bandwidth of the cable system;
  means for transmitting a request to the user station requesting transmission of the received number to the telephone switch using the preempted part of the portion of the bandwidth of the cable system; and
  means for transmitting a request to provide a busy signal to the user station if the received number is not an emergency call number associated with the emergency call service and the portion of the bandwidth of the cable system which is allocated to the cable telephony system is fully utilized.

* * * * *